United States Patent [19]
Altus

[11] Patent Number: 5,052,283
[45] Date of Patent: Oct. 1, 1991

[54] AUTOMOTIVE AIR DISTRIBUTION SYSTEM

[75] Inventor: Mark Altus, West Bloomfield, Mich.

[73] Assignee: The 2500 Corporation, Farmington Hills, Mich.

[21] Appl. No.: 426,973

[22] Filed: Oct. 25, 1989

[51] Int. Cl.$^5$ .............................................. B60H 1/34
[52] U.S. Cl. .................................................... 98/2.03
[58] Field of Search ............................ 98/2, 2.03, 2.05; 62/244; 165/42, 43

[56] References Cited

U.S. PATENT DOCUMENTS

| | | | |
|---|---|---|---|
| 3,394,887 | 7/1968 | Megargle et al. | 98/2.03 X |
| 4,512,239 | 4/1985 | Watanabe et al. | 98/2.03 |

FOREIGN PATENT DOCUMENTS

| | | | |
|---|---|---|---|
| 156411 | 9/1983 | Japan | 98/2.03 |
| 177704 | 10/1983 | Japan . | |
| 177705 | 10/1983 | Japan | 98/2.05 |
| 32513 | 2/1984 | Japan | 98/2.03 |

Primary Examiner—Harold Joyce
Attorney, Agent, or Firm—Dykema Gossett

[57] ABSTRACT

An automotive air distribution system including at least one floor mat for an automobile, having one or more air distribution channels provided therein, which are connected by way of connecting hoses and an adaptor, to an outlet of conditioned air in an automobile, such as a heater outlet. The air channels in the hollow floor mat may heat or cool the upper surface of the floor mat simply by convection or by encloseable valve means communicating with the top surface of the floor mat to let air escape from the air distribution channels through the top surface of the floor mat. Such air distribution means may also be provided in the rear seat of an automotive type vehicle by having one or more rear floor mats with similar air distribution channels and air outlets connected to the rear of the front floor mat by an additional air distribution hose.

42 Claims, 2 Drawing Sheets

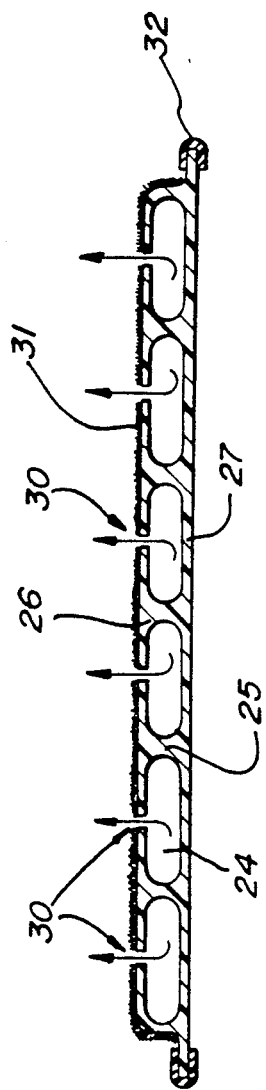
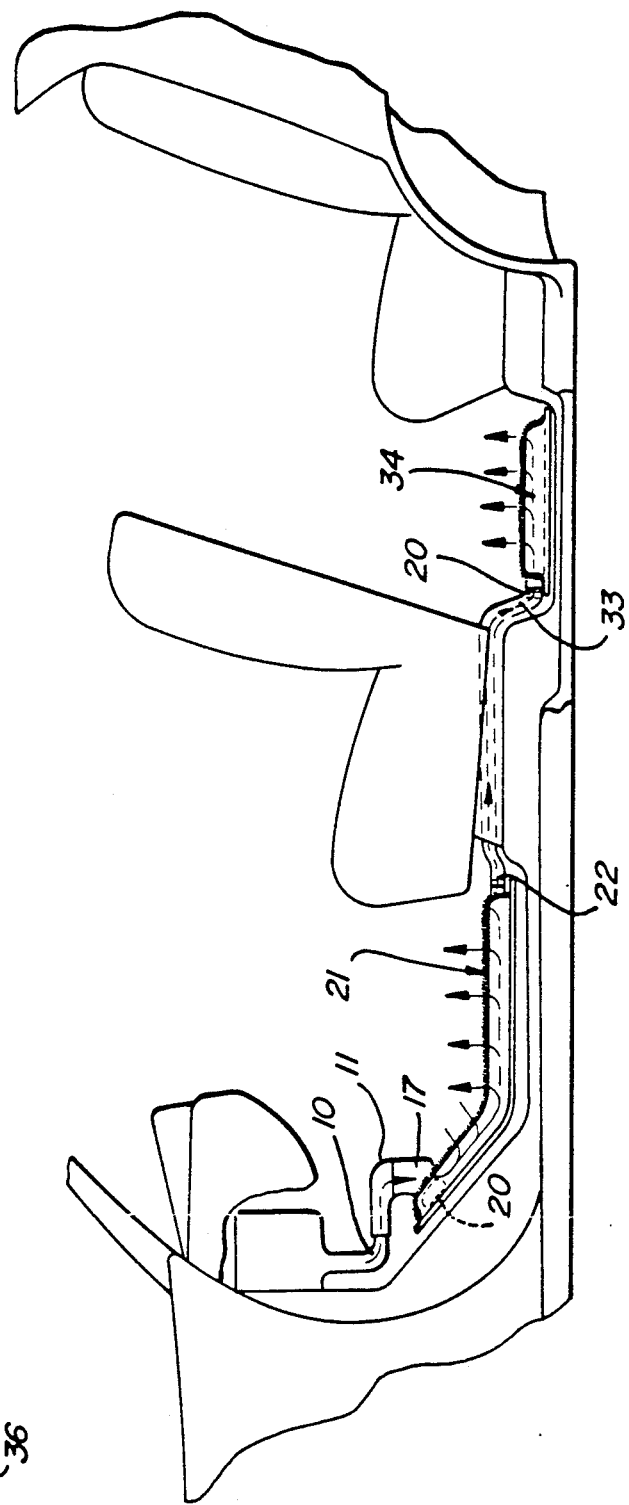
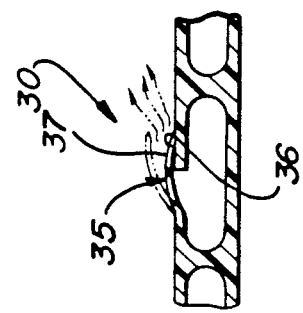

AUTOMOTIVE AIR DISTRIBUTION SYSTEM

BACKGROUND OF THE INVENTION

1. Field of the Invention

The present invention relates to a system for distributing conditioned air within the interior of an automotive type vehicle, and more particularly to such a system which involves a distribution of heated or cooled air through hollow front and/or rear floor mats which are provided in place of the standard automotive floor mats and, thus, serve two (2) purposes, that of protecting the automotive carpeting, and that of distributing conditioned air.

2. Description of the Prior Art

It has long been the practice in automotive type vehicles to distribute heated air in the interior of said vehicles in cool or inclimate weather through one (1) or more heater outlets located below the dash board at the front of the automotive vehicle. Such heater outlets, however, only heat the front of the passenger compartment of the automotive vehicle and, unless several of such outlets are provided, which increases expense, it is normal for only one (1) outlet to be provided in the center of the dash board below the same, which provides spoty heating of the front passenger compartment at best, leaving the rear seat passengers without heat in cold weather.

In an attempt to alleviate the problem Df the rear seat passengers being cold, il has been attempted to provide additional air outlets under the front seat of the passenger compartment. However, it has been found to be very expensive to run the special piping necessary to provide such outlets, and for the most part, any attempt to provide heat to the rear seat passengers has been discontinued, except for some specialized vehicles which have entire, separate, heating systems for the rear thereof.

In order to provide an air distribution system for a motor vehicle which eliminates the above-mentioned problems in the prior art, a system is provided which distributes heated or cooled air to the front and/or rear passenger compartments of an automotive vehicle through the provision of one (1) or more hollow floor mats having air distribution means contained in the interior thereof, and which are connected to the source of conditioned air, such as an automotive heater outlet, through an adaptor. When heated air is being supplied in wet or inclimate weather, a beneficial result of the present invention is the evaporation of moisture which would otherwise remain on the vehicle floor.

Thus, it is an object of the present invention to provide an improved means for distribution of conditioned air in an automotive type vehicle.

It is a further object of the present invention to provide an improved means for supplying heated air to the rear passenger compartment of an automobile.

It is a further object of the present invention to provide an improved means for distribution of conditioned air in an automotive vehicle utilizing hollow floor mats having air distribution means interiorly thereof.

It is a further object of the present invention to provide hollow floor mats of the foregoing nature both in the front and rear passenger compartment of the automotive vehicle.

It is a further object of the present invention to provide an improved air distribution means of the foregoing nature which is relatively simple in construction, and inexpensive to manufacture.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 3 is a sectional view, taken in the direction of the arrows, along the section line 3—3 of FIG. 1.

FIG. 4 is an elevation al, diagrammatic, view of a construction embodying the present invention.

FIG. 5 is a view similar in part to FIG. 3 but showing a modification of the invention wherein a membrane type valve is mounted over the air outlet means.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF PREFERRED EMBODIMENT

Figure 1:
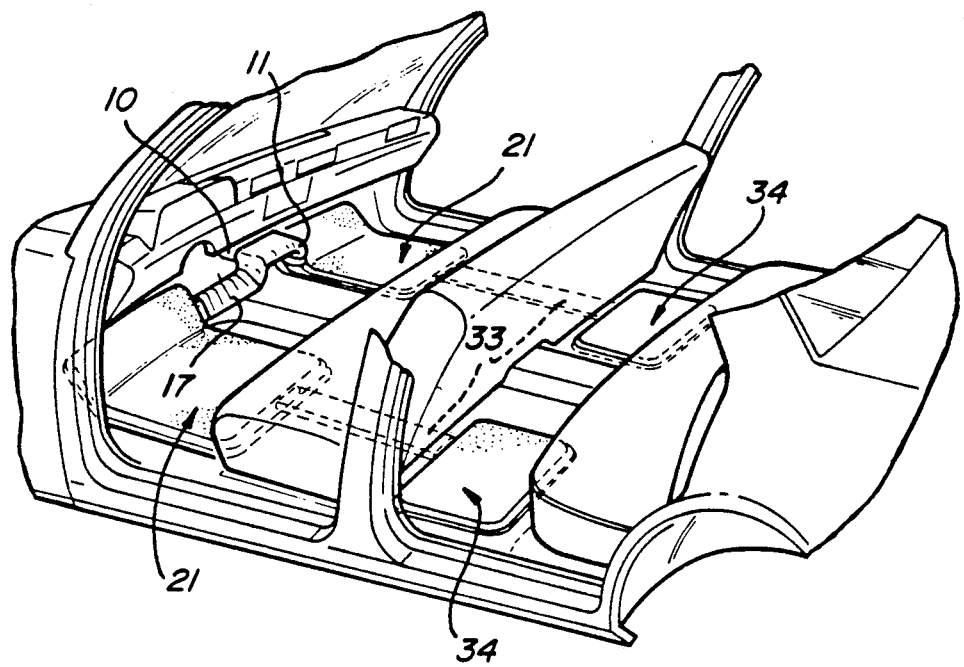
FIG. 1 is a perspective view, partially cut away, showing the interior of an automotive vehicle having my improved air distribution means installed therein.
Figure 2:
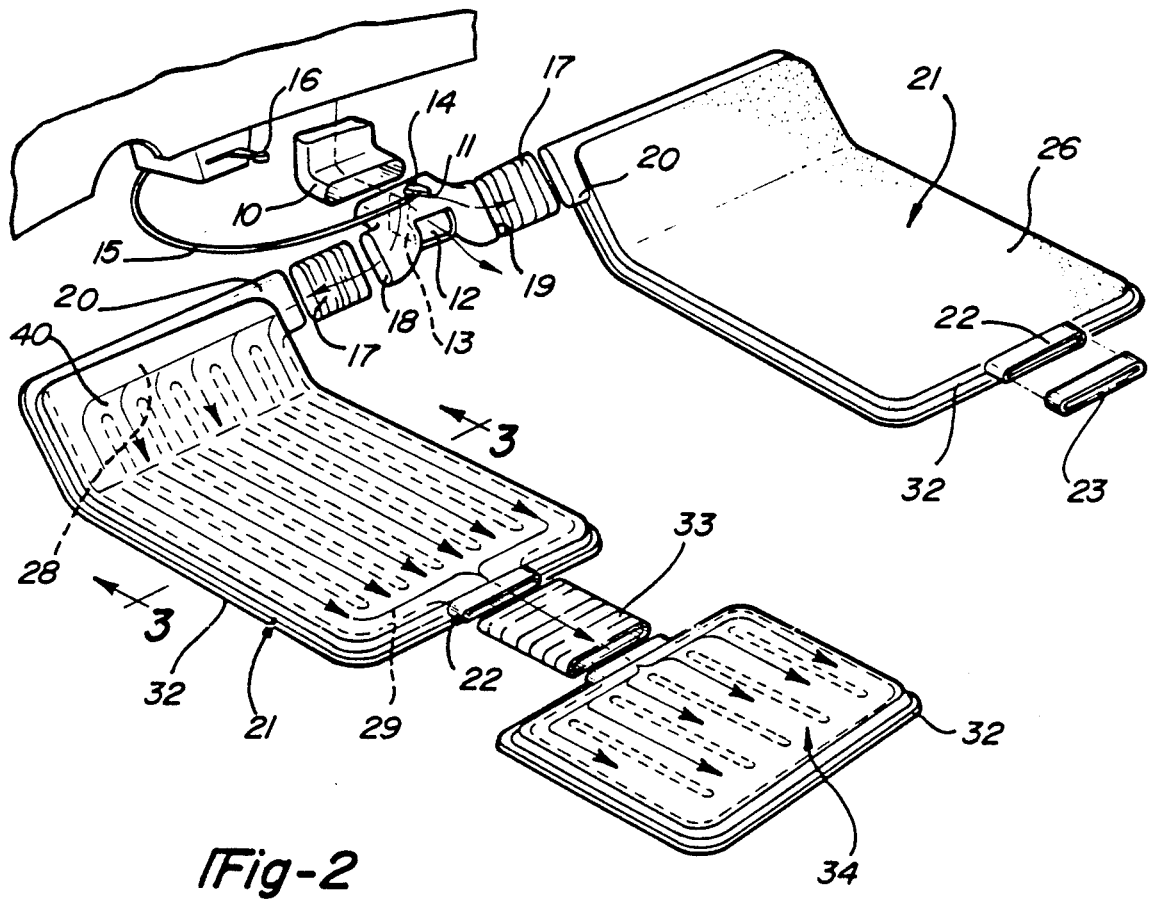
FIG. 2 is an exploded perspective view showing a construction embodying the present invention.

Referring now to FIG. 1, there is shown a perspective view, partially cut away, of an automobile passenger compartment. While my invention is capable of being used in both automotive and non-automotive applications and may be used, for example, in a pick-up truck having only a front passenger compartment, for ease of understanding the invention, I illustrate it installed in a conventional four (4) door passenger automobile. An exploded view of many of the components shown in FIG. 1 is shown in FIG. 2.

A passenger automobile is usually provided with an outlet for conditioned air, such as heated or cooled air, and such an outlet is generally designated by the numeral 10, which in the illustration shown represents a heater outlet. Attached to the heater outlet by any practicable attaching means is an adaptor 11. The adaptor has an outlet 12 through which air from the heater outlet 10 can directly pass, assisted by a fan or blower (not shown) if desired, and it has a valve means 13, operated by arm 14, which is connected by a cable 15, to lever 16, which is operable by the driver or passenger of the motor vehicle to direct more or less air to one or the other of the connection means 17. It should be understood that while cable 15 shows a mechanical means of connecting lever 16, with arm 14, this is representative only, and hydraulic or electrical control means could also be used to operate valve means 13.

If my air distribution system is used in an automobile where only the driver wishes to use my air distribution means, the adaptor 11 will only have a single outlet, which may be such as a left hand outlet 18, or it may also have a right hand outlet 19. Connected to each of the outlets would be a connection means 17, which would connect to the air distribution inlet 20 of my improved floor mat, generally designated by the numeral 21. Such floor mat, in addition to the air distribution inlet 20, will have an air distribution outlet 22, which may be closed by a cap 23 if a rear floor mat is not to be used.

Connecting the air distribution inlet and the air distribution outlet is at least a single conduit to provide for air flow between the air distribution inlet 20 and the air distribution outlet 22. The conduit between said inlet and said outlet may take many shapes and sizes depending on the particular design requirements of the air distribution system being designed. In the preferred embodiment, such conduit takes the form of a plurality of hollow channels 24 separated by side walls 25, the top 26, and the bottom 27, of the floor mat. At the upper end of said plurality of parallel channels is a first header 28 and at the lower end thereof is a second header 29.

Referring now to FIG. 3, it can be seen that air outlet means 30 can be provided in the top 26 of the floor mat 21 to provide for the communication of the conditioned air traveling under pressure through the hollow channels 24 to atmosphere proximate the top of the floor mat, where the passenger's feet will be resting, thereby providing for warming of the passenger and circulating of the heated air in the passenger compartment.

The floor mat 21 may be of one (1) piece construction, or two (2) piece construction, and may have carpeting 31 on the top thereof and an edge binding 32 around the perimeter thereof. If desired, simulated carpeting may be provided in place of the carpeting 31 by flocking onto the top surface thereof.

Referring now to FIGS. 2 and 4, it can be seen how my improved air distribution system can also be used to distribute air to the rear seat passengers in an automobile, or to the rear area of other types of automotive vehicles. In this embodiment of my invention, it is necessary to have the front floor mats equipped with the air distribution outlets 22, it being understood that if rear floor mats are not to be used, the air distribution outlet 22 can be closed with the cap 23, or eliminated. In this case, the front floor mat 21 is connected through its air inlet means 20 to the connection means 17, which in turn, is connected to the adaptor 11, as previously described. As before, the adaptor 11 is connected to the heater outlet 10.

In this embodiment of the invention, the air distribution outlet 22 is connected to the second connection means 33. A rear floor mat, generally designated by the numeral 34, has an air distribution inlet 20 to which the other end of the second connection means 33 is connected.

The cross section of the rear floor mat 34 may be similar to that of the front floor mat shown in FIG. 3, and have &he air outlet means 30 to provide communication between atmosphere and the plurality of hollow channels 24 formed by the side walls 25 and the top 26 and the bottom 27 of the floor mat.

Since, as can be understood, the air flow through the front floor mat 21, and the rear floor mat 34, must be sufficient to enable air to exit the air outlet means 30, if provided. The air outlet means 30 in the front floor mats may be of smaller capacity than those provided in the rear floor mats so that not too much pressure will be lost as air travels through the front floor mat. Also, the number of air outlet means 30 in the front floor mat 21 may be different than in the rear floor mat 34, or a combination of both may be used to accomplish the desired air distribution.

Referring now to FIG. 5, in order to prevent dirt from clogging the air outlet means 30, an air valve means 35 may be provided over some or all of the air outlet means 30. These air valve means 35 may be of any practicable construction but in the preferred embodiment of the invention, it is preferred that they take the form of thin membrane type valve 36 having a portion 37 which is forced open when there is positive air pressure in the hollow Channels 24 and which will be self closing when for example, the heater of the automobile is turned off, and there is no pressure in said channel 24.

To prevent the possibility of the air outlet means 30 clogging in the heavily used front floor mat 21, such means may be placed in the upper portion 40 of the floor mat which rests against the toe pan of the automobile (not shown). In this case the air outlet means may be provided in such a direction as to provide a horizontal output of air parallel to the floor of the automobile to provide a uniform distribution of air over the top of the entire floor mat.

Thus, by providing a novel air distribution system for an automotive vehicle employing one or more floor mats having air distribution means interiorly thereof, I have solved problems of long standing in the automotive art.

I claim:

1. An automotive air distribution system including, in combination:
   (a) an adapter connected to an outlet of conditioned air in an automotive vehicle,
   (b) at least one floor mat having air distribution means interiorly thereof,
   (c) air outlet means connecting said air distribution means to atmosphere through the top surface of said floor mat,
   (d) an air distribution inlet in fluid communication with said air distribution means, and
   (e) at least open connection means connecting said air distribution inlet to said adapter.

2. The system defined in claim 1, wherein:
   (a) said floor mat further includes an air distribution outlet proximate the rear thereof, said air distribution outlet being in fluid communication with said air distribution means.

3. The system defined in claim 2, and further including:
   (a) a cap closing said air distribution outlet.

4. The system defined in claim 2, wherein said floor mat is a front floor mat.

5. The system defined in claim 2, and further including:
   (a) at least one rear floor mat having air distribution means provided interiorly thereof,
   (b) an air distribution inlet in fluid communication with said air distribution means, and
   (c) a second connection means connecting said rear floor mat air distribution inlet to said front floor mat air distribution outlet.

6. The system defined in claim 5, and further including:
   (a) two of said front floor mats,
   (b) two of said rear floor mats,
   (c) two of said connection means, connected one each between said air distribution inlet of each of said front floor mats and said adapter,
   (d) two of said second connection means, connected one each between said air distribution inlet of each of said rear floor mat and said front floor mat air distribution outlets.

7. The system defined in claim 1, wherein said air distribution means of said floor mat include:
(a) at least one conduit extending from said air distribution inlet to the rear of said floor mat.

8. The system defined in claim 2, wherein said air distribution means of said floor mat includes:
(a) at least one conduit extending from said air distribution inlet to said air distribution outlet.

9. The system defined in claim 5, wherein said air distribution means of said front and said rear floor mats includes:
(a) a plurality of hollow channels provided in said floor mat between the top and bottom of said floor mat, and extending from said air distribution inlet to the rear of said mat, and
(b) air outlet means connecting said hollow channels to atmosphere through the top of said floor mat.

10. The system defined in claim 1, wherein said air distribution means of said floor mat includes:
(a) a conduit extending between said air distribution inlet and the rear of said floor mat.

11. The system defined in claim 2, wherein said air distribution means for said floor mat includes:
(a) a first header in fluid communication with said air distribution inlet,
(b) a second header in fluid communication with said air distribution outlet,
(c) a conduit extending between said air distribution inlet and said air distribution outlet, and
(d) air outlet means connecting said conduit to atmosphere.

12. The system defined in claim 11, wherein said conduit includes a plurality of parallel conduits provided in said floor mat il fluid communication with said first and said second headers.

13. The system defined in claim 3, wherein said air distribution means for said floor mat includes:
(a) a first header in fluid communication with said air distribution inlet,
(b) a second header in fluid communication with said air distribution outlet,
(c) a conduit extending between said air distribution inlet and said air distribution outlet, and
(d) air outlet means connecting said conduit to atmosphere.

14. The system defined in claim 13, wherein said conduit includes a plurality of parallel conduits provided in said floor mat in fluid communication with said first and said second header.

15. The system defined in claim 4, wherein said air distribution means for said floor mat includes:
(a) a first header in fluid communication with said air distribution inlet,
(b) a second header in fluid communication with said air distribution outlet,
(c) a conduit extending between said inlet and said outlet, and
(d) air outlet means connecting said conduit to atmosphere.

16. The system defined in claim 15, wherein said conduits include a plurality of parallel channels provided in said floor mat in fluid communication with said first and said second header.

17. The system defined in claim 5, wherein said air distribution means of said rear floor mat includes:
(a) a first header in fluid communication with said air distribution inlet,
(b) a second header provided proximate the rear of said rear floor mat, and
(c) a conduit &n fluid communication with said first header and said second header.

18. The system defined in claim 17, wherein said air distribution means includes:
(a) air outlet means connecting said conduit to atmosphere.

19. The system defined in claim 18, wherein said conduit includes:
(a) a plurality of hollow channels provided in said floor mat between the top and bottom thereof in fluid communication with said first header and said second header.

20. The system defined in claim 19, wherein said hollow channels are parallel to each other, and are each separated from adjacent channels by at least one side wall.

21. The mat defined in claim 16, wherein said air outlet means include pressure operated valve means which allow communication with atmosphere only when positive air pressure is present in said conduit.

22. The mat defined in claim 11, wherein said air outlet means include pressure operated valve means which allow communication with atmosphere only when positive air pressure is present in said conduit.

23. The air distribution system defined in claim 1, wherein said adaptor includes:
(a) a right hand outlet,
(b) a left hand outlet,
(c) an outlet,
(d) a valve means to divide air between said outlet, said right hand outlet, and said left hand outlet, said valve means being controllable by a control lever.

24. The device defined in claim 23, wherein said lever is connected to a cable which is in turn connected to a dash mounted control lever to be operated by the occupant of the automotive vehicle.

25. The device defined in claim 23, wherein said adapter further includes a fan.

26. The device defined in claim 23, wherein said valve means is operated by an electrical control means.

27. The device defined in claim 23, wherein said valve means is operated by a hydraulic control means.

28. An automotive air distribution system including, in combination:
(a) an adapter connected to an outlet of conditioned air in an automotive vehicle,
(b) at least one floor mat having air distribution means interiorly thereof,
wherein said air distribution means:
(i) a plurality of hollow channels provided in said floor mat between the top and bottom of said floor mat, and extending from said air distribution inlet to the rear of said floor mat, and
(ii) air outlet means connected said hollow channels to atmosphere through the top surface of said floor mat
(c) an air distribution inlet in fluid communication with said air distribution means, and
(d) at least one connection means connecting said air distribution inlet to said adapter.

29. The system defined in claim 28, wherein said hollow channels are parallel to each other and are each separated from adjacent channels by at least one side wall.

30. An automotive floormat having a top and bottom surface and including:
   (a) air distribution means provided interiorly of said mat, and
   (b) an air distribution inlet in fluid communication with said air distribution means, and;
   (c) air outlet means connecting said air distribution means to atmosphere through the top surface of said floormat.

31. The mat defined in claim 30, and including an air distribution outlet in fluid communication with said air distribution means.

32. The mat defined in claim 31, wherein said air distribution means include:
   (a) at least one conduit in fluid communication with said air distribution inlet and said air distribution outlet.

33. The mat defined in claim 30, and including:
   (a) at least one conduit in fluid communication with said air distribution inlet.

34. The mat defined in claim 32, wherein said conduit further includes:
   (a) a first header in fluid communication with said air distribution inlet,
   (b) a second header in communication with said air distribution outlet, and
   (c) a plurality of parallel hollow channels providing fluid communication between said first header and said second header.

35. The mat defined in claim 33, wherein said conduit further includes:
   (a) a first header in fluid communication with said air distribution inlet,
   (b) a second header provided proximate the rear of said floor,
   (c) a plurality of parallel hollow channels providing fluid communication between said first header and said second header.

36. The mat defined in claim 34, with a cap closing said air distribution outlet.

37. The mat defined in claim 35, wherein said mat is an automotive floor mat.

38. The mat defined in claim 36, wherein said mat is an automotive floor mat.

39. The mat defined in claim 37, wherein said automotive floor mat is a front floor mat.

40. The mat defined in claim 35, wherein said automotive floor mat is a rear floor mat.

41. The mat defined in claim 38, wherein said automotive floor mat is a front floor mat.

42. The mat defined in claim 30, wherein said air outlet means include pressure operated valve means which allow communication with atmosphere only when positive air pressure is present in said conduit.

* * * * *

UNITED STATES PATENT AND TRADEMARK OFFICE
CERTIFICATE OF CORRECTION

PATENT NO. : 5,052,283
DATED : October 1, 1991
INVENTOR(S) : Mark Altus It is certified that error appears in the above-identified patent and that said Letters Patent is hereby corrected as shown below:

In column 4, line 39, please delete "open" and add --one--; in

Line 37, please delete "il" and add --in--; in column 6, line 5, please delete "n" and add --in--; and in line 58, please delete "connected" and add --connecting--.

Signed and Sealed this

Ninth Day of February, 1993

*Attest:*

STEPHEN G. KUNIN

*Attesting Officer*     *Acting Commissioner of Patents and Trademarks*